(12) United States Patent
Kim et al.

(10) Patent No.: US 9,231,241 B2
(45) Date of Patent: Jan. 5, 2016

(54) BATTERY PACK

(75) Inventors: Dukjung Kim, Yongin-si (KR);
Minhyung Guen, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 1005 days.

(21) Appl. No.: 13/366,474

(22) Filed: Feb. 6, 2012

(65) Prior Publication Data

US 2012/0256582 A1 Oct. 11, 2012

(30) Foreign Application Priority Data

Apr. 7, 2011 (KR) ........................ 10-2011-0032031

(51) Int. Cl.
| | |
|---|---|
| *H02J 7/00* | (2006.01) |
| *H01M 2/30* | (2006.01) |
| *H02J 7/32* | (2006.01) |
| *H01M 10/46* | (2006.01) |
| *H01M 2/10* | (2006.01) |
| *H02N 2/18* | (2006.01) |

(52) U.S. Cl.
CPC ............ *H01M 2/305* (2013.01); *H01M 2/1077* (2013.01); *H01M 2/1083* (2013.01); *H01M 10/46* (2013.01); *H02J 7/32* (2013.01); *H01M 2220/20* (2013.01); *H02N 2/18* (2013.01)

(58) Field of Classification Search
CPC ............ H02J 7/00; H02J 7/32; H01M 10/46; H02N 2/18
USPC .............. 320/101, 112, 137, 162; 310/316.03
See application file for complete search history.

(56) References Cited

U.S. PATENT DOCUMENTS

| | | | |
|---|---|---|---|
| 7,160,644 B2* | 1/2007 | White et al. | ..................... 429/99 |
| 2009/0096413 A1* | 4/2009 | Partovi et al. | .................. 320/108 |
| 2010/0045241 A1* | 2/2010 | Nousiainen | .................... 320/137 |
| 2010/0151317 A1 | 6/2010 | Kim et al. | |
| 2012/0094155 A1* | 4/2012 | Lim | ................................ 429/82 |

FOREIGN PATENT DOCUMENTS

| | | | |
|---|---|---|---|
| JP | 09-245842 | * | 9/1997 |
| JP | 09-245842 | A | 9/1997 |
| JP | 2007-323950 | A | 12/2007 |
| JP | 2008-218005 | A | 9/2008 |
| JP | 2009-231125 | A | 10/2009 |
| KR | 2002-0035207 | A | 5/2002 |
| KR | 10-2010-0068080 | A | 6/2010 |
| KR | 10-1104229 | B1 | 1/2012 |

OTHER PUBLICATIONS

Korean Notice of Allowance dated Mar. 28, 2013.
Korean Office action dated Sep. 17, 2012 for KR 10-2011-0032031 (Kim, et al.).

* cited by examiner

*Primary Examiner* — Richard Isla Rodas
*Assistant Examiner* — Nathaniel Pelton
(74) *Attorney, Agent, or Firm* — Lee & Morse, P.C.

(57) ABSTRACT

A battery pack including a secondary battery arranged on an elastic member and a piezoelectric member is provided. Vertical movement of the secondary battery within the battery pack generates electrical energy that may be used to charge the secondary battery.

17 Claims, 14 Drawing Sheets

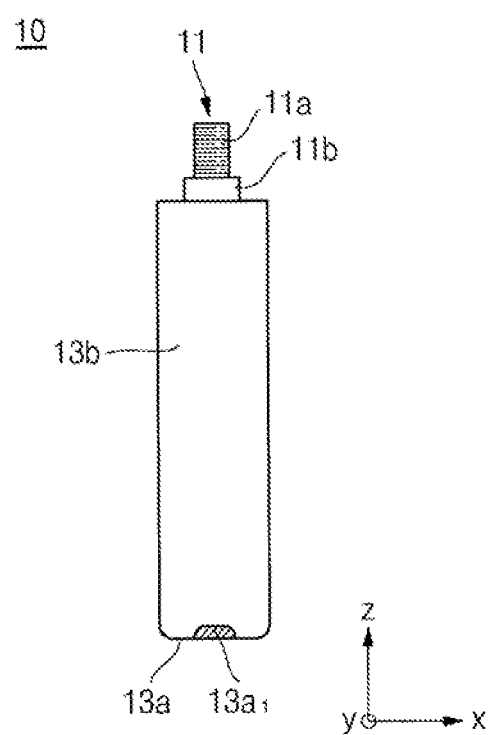

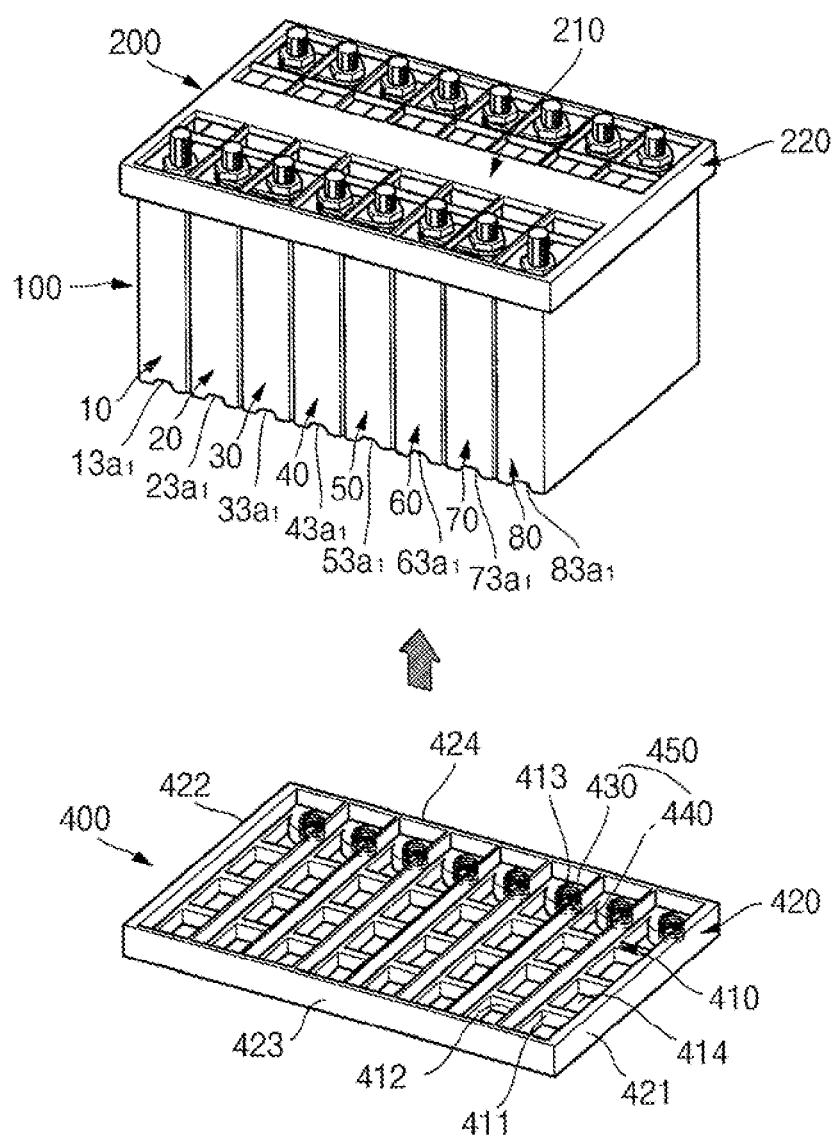

BATTERY PACK

BACKGROUND

1. Field

Embodiments relate to a battery pack.

2. Description of the Related Art

Hybrid or electric vehicles, which use an interaction between an engine and a motor, include a secondary battery as a power device. For example, lithium ion secondary batteries, which are non-aqueous secondary batteries having high output and high energy density, are regarded with much interest as power sources of electric vehicles.

Such a secondary battery includes: a case; an electrode assembly including a positive electrode plate, a separator, and a negative electrode plate; a positive terminal connected to the positive electrode plate; a negative terminal connected to the negative electrode plate; and a cap plate coupled to the case to receive electrolyte and the electrode assembly and to fix the positive terminal and the negative terminal. The cap plate may include a safety vent that ruptures and emits gas when a large amount of gas is generated during the charging or discharging of the battery.

Such secondary batteries may be arrayed in parallel, and be connected to one another in parallel or in series to form a battery pack for generating high electric power.

SUMMARY

One or more embodiments provide a battery pack in which electrical energy generated by vertical movement of a secondary battery is used to charge the secondary battery.

One or more embodiments provide a battery pack in which the top and bottom surfaces of a battery are coupled to a flat cover member and a flat support member, respectively, thereby ensuring flatness, durability and assembly quality of a secondary battery module.

One or more embodiments provide a battery pack that includes elastic members between the top surface of a secondary battery and a cover member, and between the bottom surface of the secondary battery and a support member, to absorb vibration, thereby improving the durability of the battery pack against external shock and vibration.

One or more embodiments provide a battery pack, including at least one secondary battery including: an electrode assembly; a case accommodating the electrode assembly; and a collecting terminal electrically connected to the electrode assembly and protruding out of the case, a support member supporting the secondary battery, an energy generating part disposed between the secondary battery and the support member and configured to generate electrical energy, and an energy, supplying part configured to supply the electrical energy generated from the energy generating part to the secondary battery.

The energy generating part may include an elastic member contacting the secondary battery, and a piezoelectric device disposed between the elastic member and the support member.

The elastic member may include a coil spring.

The piezoelectric device may generate electrical energy by a vertical movement of the secondary battery.

The energy supplying part may include a voltage boosting part configured to boost the electrical energy generated by the energy generating part to a voltage having a level for charging the secondary battery, a rectifier configured to rectify the voltage output from the voltage boosting part to a direct current voltage, and an overvoltage protection part configured to limit the direct current voltage to a charge voltage value of the secondary battery or to a smaller value than the charge voltage value.

The piezoelectric device may include a first contact point electrically connected to a positive terminal of the energy supplying part, and a second contact point electrically connected to a negative terminal of the energy supplying part.

The positive terminal of the energy supplying part may be electrically connected to a positive terminal of the collecting terminal, and the negative terminal of the energy supplying part may be electrically connected to a negative terminal of the collecting terminal.

The support member may include a horizontal part having a flat surface, and a sidewall part extending from an edge of the horizontal part toward the secondary battery.

The horizontal part may include a positioning recess that is coupled to the energy generating part.

A line through hole may be disposed under the positioning recess.

The horizontal part may include a vertical part protruding toward the secondary battery such that the vertical part at least partially fits between the secondary batteries.

The vertical part may be disposed at a lower position than that of the sidewall part and the vertical part and the sidewall part define a cavity-like region for receiving the secondary battery.

The battery pack may include a cover member including a through hole through which the collecting terminal passes, and at least partially surrounding a surface of the secondary battery facing the cover member.

One or more embodiments provide a battery pack, including at least one secondary battery, an energy generator configured to generate electrical energy based on movement of the secondary battery, and an energy supplying part configured to supply the electrical energy generated from the energy generating part to the secondary battery.

The secondary battery may include at least one coupling recess along an outer surface thereof; and the energy generator is at least partially arranged within the coupling recess of the secondary battery.

The energy generator may include an elastic member and a piezoelectric device, the elastic member being arranged between an outer surface of the secondary battery and the piezoelectric device.

The elastic member may be a coil spring.

The energy generator may generate electrical energy from movement of the secondary battery relative to the elastic member.

The piezoelectric device may include a positive contact point and a negative contact point, the energy supplying part includes a positive terminal and a negative terminal, and a first conductive line electrically couples the positive contact point of the piezoelectric device with the positive terminal of the energy supplying part and a second conductive line electrically couples the negative contact point of the piezoelectric device with the negative terminal of the energy supplying part.

One or more embodiments provide a battery pack including at least one secondary battery at least partially surrounded by a covering member, including energy generator for generating electrical energy based on movement of the secondary battery, the energy generator being arranged between the covering member and the secondary battery, and energy supplier for supplying the electrical energy generated from the energy generator to the secondary battery.

BRIEF DESCRIPTION OF THE DRAWINGS

Features will become more apparent to those of ordinary skill in the art by describing in detail exemplary embodiments with reference to the attached drawings, in which:

FIG. 2B illustrates a side view of the exemplary embodiment of the secondary battery of FIG. 2A;

FIGS. 5A through 5E illustrate perspective views of stages in an exemplary embodiment of a method of assembling the battery pack of FIG. 1 including a secondary battery module.

DETAILED DESCRIPTION

Figure 1:
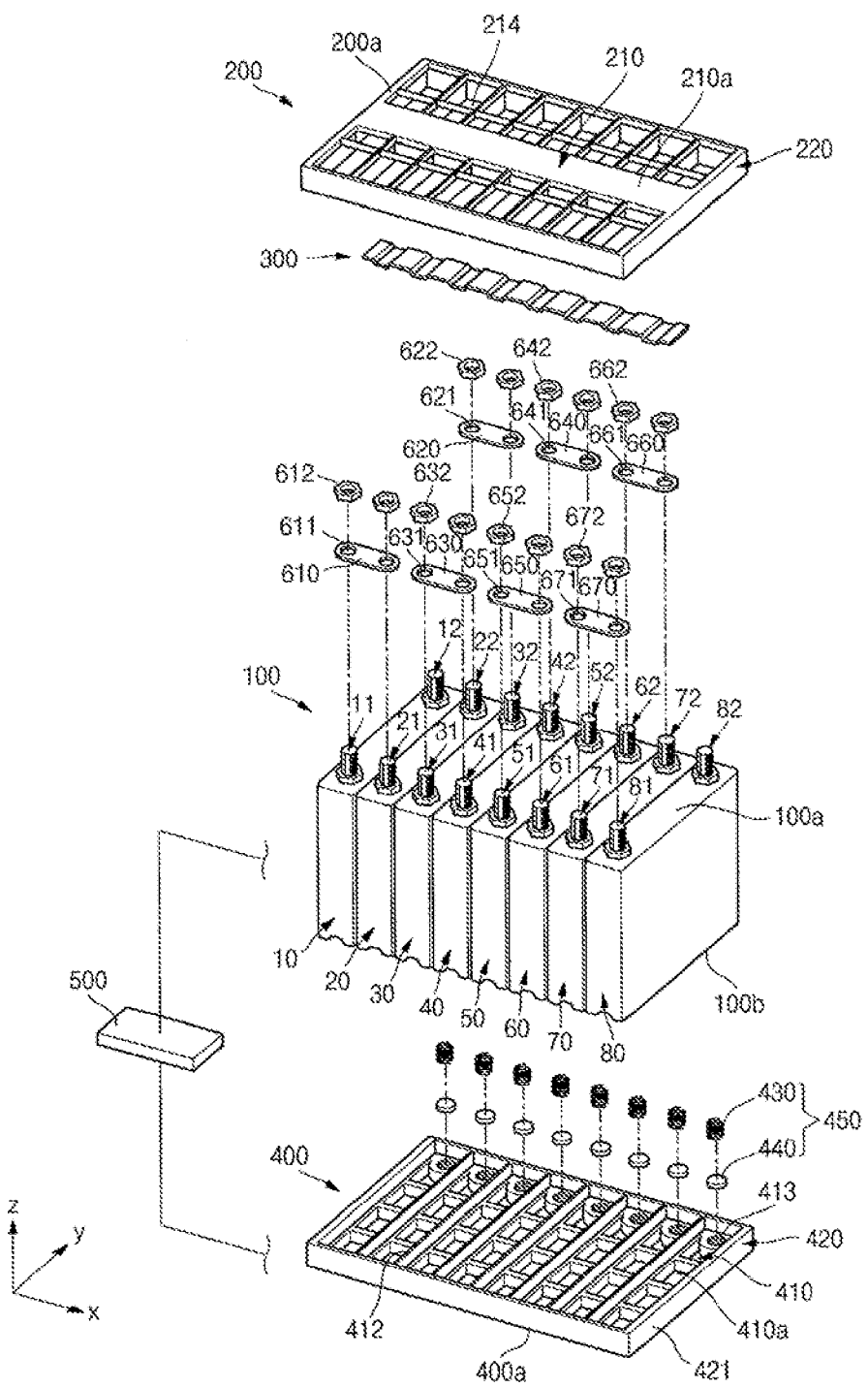
FIG. 1 illustrates an exploded perspective view of an exemplary embodiment of a battery pack.

Korean Patent Application No. 10-2011-0032031 filed on Apr. 7, 2011, in the Korean Intellectual Property Office, and entitled: "Battery Pack" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of regions may be exaggerated for clarity of illustration. It will also be understood that when an element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout the specification.

Hereinafter, embodiments will be described in detail with reference to the accompanying drawings.

Figure 2A:
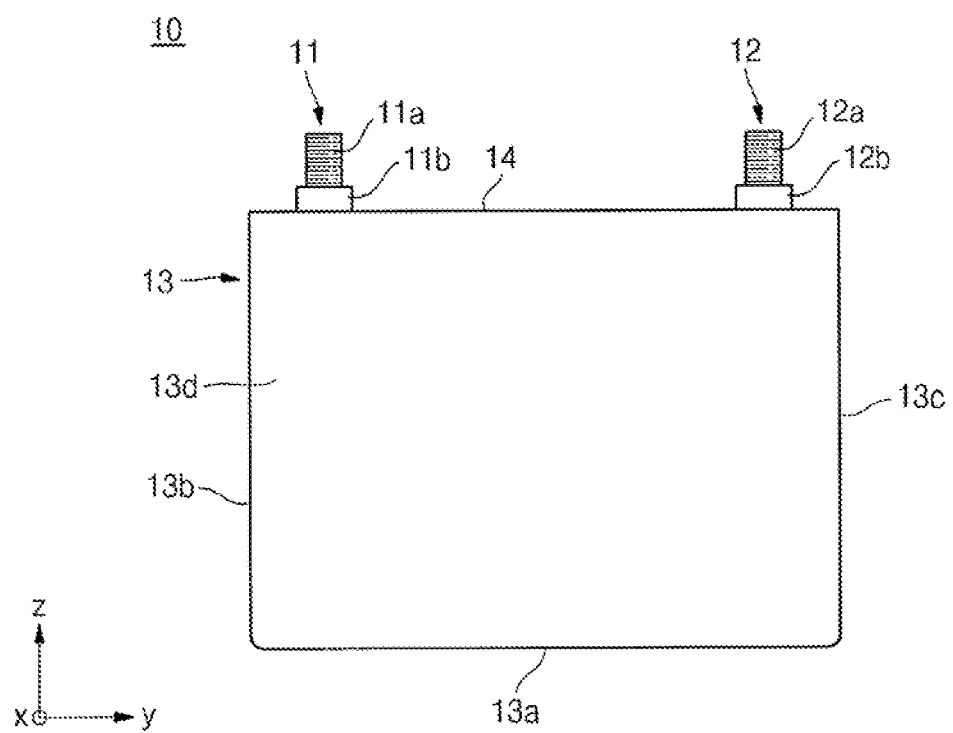
FIG. 2A illustrates a front view of an exemplary embodiment of a secondary battery employable in the battery pack of FIG. 1.
Figure 2C:
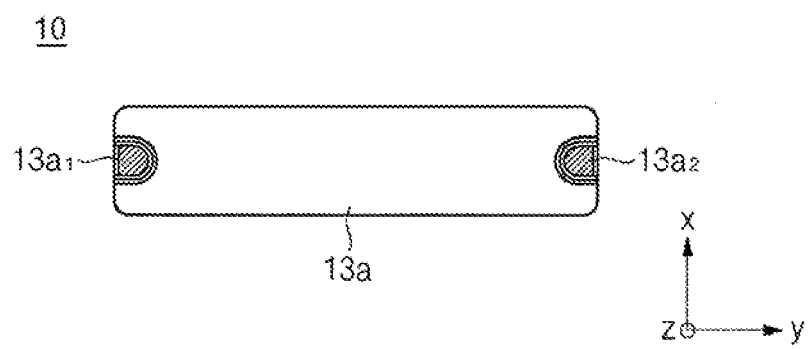
FIG. 2C illustrates a bottom of the exemplary embodiment of the secondary battery of FIGS. 2A and 2B.
Figure 2D:
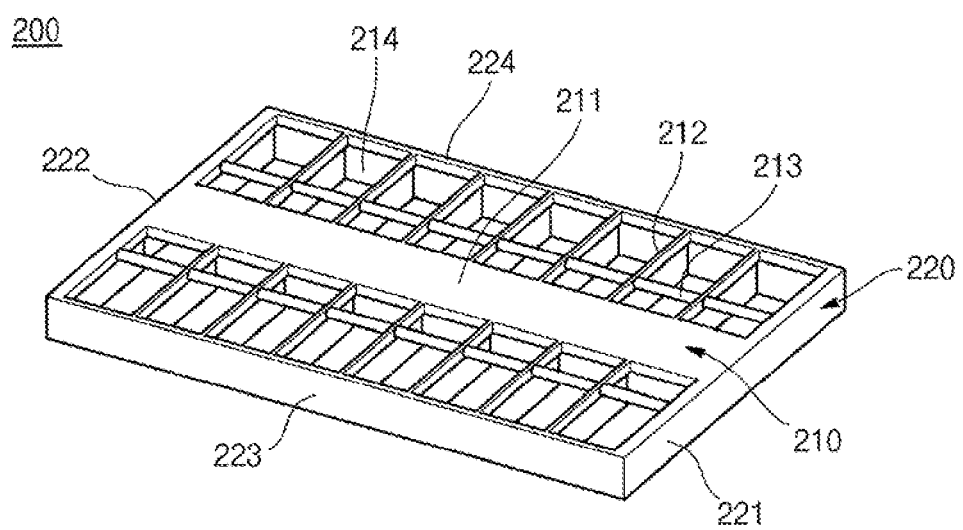
FIG. 2D illustrates a perspective view of an exemplary embodiment of a cover member of the battery pack of FIG. 1.
Figure 2E:
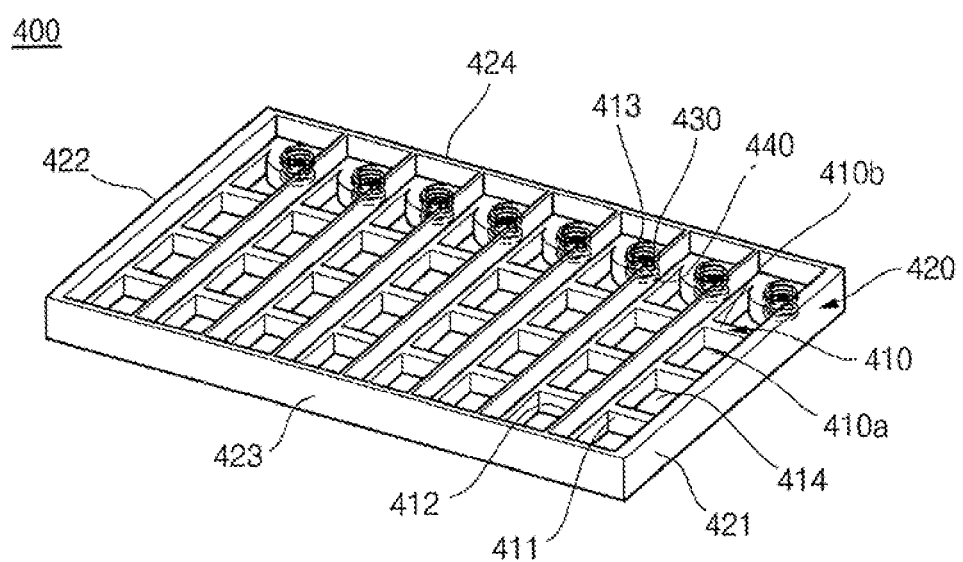
FIG. 2E illustrates a perspective view of an exemplary embodiment of a support member employable in the battery pack of FIG. 1.
Figure 3A:
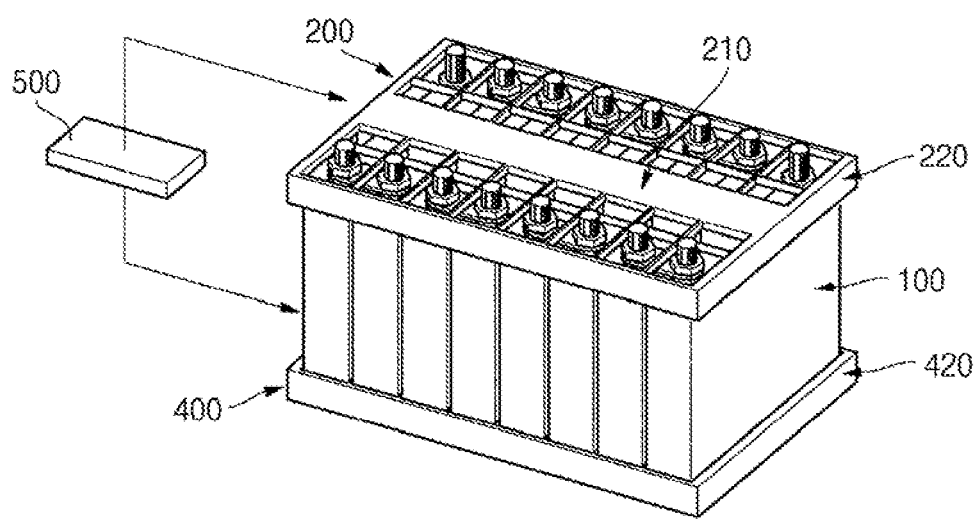
FIG. 3A illustrates a perspective view of the exemplary embodiment of the battery pack of FIG. 1.
Figure 3B:
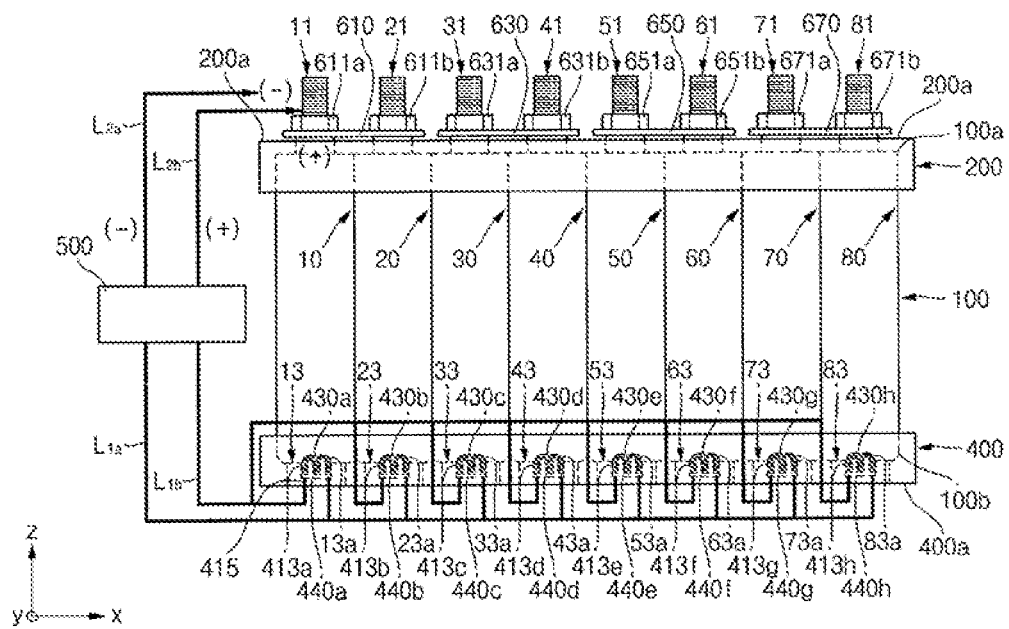
FIG. 3B illustrates a side view of the exemplary embodiment of the battery pack of FIG. 1.
Figure 4:
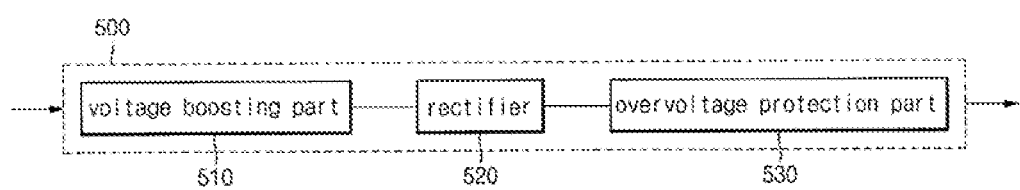
FIG. 4 illustrates a block diagram of an exemplary embodiment of an energy supply part of the battery pack of FIG. 1.

FIG. 1 illustrates an exploded perspective view of an exemplary embodiment of a battery pack. FIG. 2A illustrates a front view of an exemplary embodiment of a secondary battery 10 employable in the battery pack of FIG. 1. FIG. 2B illustrates a side view of the exemplary embodiment of the secondary battery 10 of FIG. 2A. FIG. 2C illustrates a bottom of the exemplary embodiment of the secondary battery of FIGS. 2A and 2B. FIG. 2D illustrates a perspective view of an exemplary embodiment of a cover member 200 of a battery pack. FIG. 2E illustrates a perspective view of an exemplary embodiment of a support member 400 employable in the battery pack of FIG. 1. FIG. 3A illustrates a perspective view of the exemplary embodiment of the battery pack of FIG. 1. FIG. 3B illustrates a side view of the exemplary embodiment of the battery pack of FIG. 1. FIG. 4 illustrates a block diagram of an exemplary embodiment of an energy supply part 450 of the battery pack.

Referring to FIGS. 1 and 4, a battery pack according to an embodiment includes a secondary battery module 100, the cover member 200, the support member 400, the energy generating parts 450, and an energy supplying part 500.

The secondary battery module 100 may include a plurality of secondary batteries 10, 20, 30, 40, 50, 60, 70, 80, which may be in arranged in parallel and electrically connected to one another. In the exemplary embodiment of FIG. 1, eight secondary batteries 10, 20, 30, 40, 50, 60, 70, 80 are illustrated as an example.

Referring to FIGS. 2A to 2C, the secondary battery 10 including the secondary battery module 100 may include an electrode assembly (not shown), a case 13, a cap plate 14, and collecting terminals 11 and 12.

The electrode assembly may include a positive electrode plate, a separator, and a negative electrode plate. The positive electrode plate, the separator, and the negative electrode plate may be wound a plurality of times in an approximately oval shape about a winding axis.

The case 13 may have a substantially hexahedron shape provided with openings through which the electrode assembly, a positive terminal (also denoted by 11), and a negative terminal (also denoted by 12) may be inserted and placed. The case 13 may include, e.g., aluminum (Al), copper (Cu), iron (Fe), stainless steel (SUS), a ceramic, a polymer material, and/or an equivalent thereof. The case 13 includes a bottom surface 13a that may include one or more coupling recesses 13a1, 13a2. The coupling recesses 13a1, 13a2 may be coupled to first elastic members 430 of the support member 400.

The cap plate 14 may be coupled to the case 13 to cover the electrode assembly. For example, the cap plate 14 may be coupled to the case 13 using laser welding, resistance welding, or supersonic welding. The cap plate 14 may include the same material as that of the case 13. A safety vent may be provided in the cap plate 14. When an inner pressure of the case 13 is equal to or greater than an allowance value, the safety vent ruptures to emit inner gas to the outside. The safety vent may correspond to a region in the cap plate 14 that is thinner than other portions of the cap plate 14.

More particularly, the collecting terminals 11, 12 include the positive terminal 11 and the negative terminal 12. The positive terminal 11 and the negative terminal 12 are coupled to the cap plate 14, and protrude a predetermined length upward. The positive terminal 11 and the negative terminal 12 may have threads on surfaces thereof to couple and fix a bus bar thereto. Terminal plates 11b, 12b are coupled to upper regions 11a and 12a of the positive terminal 11 and the negative terminal 12, respectively. The terminal plates 11b and 12b may be nuts having, e.g., a hexagonal column shape. The positive terminal 11 may be electrically connected through a collecting plate to the positive electrode plate of the electrode assembly. The negative terminal 12 may be electrically connected through a collecting plate to the negative electrode plate of the electrode assembly. The positive terminal 11 and the negative terminal 12 may include, e.g., aluminum (Al) and copper (Cu), respectively.

Referring to FIG. 2D, the cover member 200 may include through holes 214 through which the collecting terminals 11 and 12 pass. The cover member 200 may cover a surface of the secondary battery module 100 facing away from the support member 400. More particularly, e.g., the cover member 200 may cover a top surface 100a of the secondary battery module 100 and the support member may be arranged on a bottom surface 100b of the battery module 100. The through holes 214 may have a circular shape or a polygonal shape such as a tetragonal shape from a plan view. The through holes 214 may be spaced a constant distance from one another respectively corresponding to collecting terminals 11, 21, 31, 41, 51, 61, 71, 81, 12, 22, 32, 42, 52, 62, 72, 82 of the secondary batteries 10, 20, 30, 40, 50, 60, 70, 80. The collecting terminals 11, 21, 31, 41, 51, 61, 71, 81, 12, 22, 32, 42, 52, 62, 72, 82 may pass through the through holes 214. The cover member 200 may include, e.g., aluminum (Al), copper (Cu), iron (Fe), stainless steel (SUS), a ceramic, a polymer material, and/or an equivalent thereof.

The cover member 200 may include a second horizontal part 210 and a second sidewall part 220. The through holes 214 are disposed in the second horizontal part 210. A top surface 200a of the cover member 200 and/or a top surface 210a of the second horizontal part 210 may be flat. The top surface 200a of the cover member 200 may partially and/or completely correspond to the top surface 210a of the horizontal part 210. The second sidewall part 220 extends from edges of the second horizontal part 210 to the secondary battery module 100, that is, extends downward, and includes sidewalls 221, 222, 223, 224. The sidewalls 221, 222, 223, 224 may be perpendicular to the second horizontal part 210.

The second horizontal part 210 may further include second vertical parts 212 that protrude downward toward the secondary battery module 100. The combination of the second horizontal part 210 and the second vertical parts 212 may create a cavity-like region that may receive and/or position the upper portions of the secondary batteries 10, 20, 30, 40, 50, 60, 70, 80. Respective portions of the second vertical parts 212 may at least partially fit between the secondary batteries 10, 20, 30, 40, 50, 60, 70, 80. The second vertical parts 212 may be disposed at a lower or inner position than that of the second sidewall part 220 when fit with the secondary battery module 100. More particularly, the second vertical parts 212 may not protrude beyond the upper surface 210a of the second horizontal part 210. The second vertical parts 212 may be aligned with and/or may contact a top surface 100a of the secondary battery module 100. The second vertical parts 212 may protrude between upper portions of respective ones of the secondary batteries 10, 20, 30, 40, 50, 60, 70, 80. The second sidewall part 220 may at least partially surround an upper portion of the secondary battery module 100. More particularly, e.g., the second sidewall part 220 may at least partially cover the top surface of the secondary battery module 100 and side surfaces of the upper portion of the second battery module 100. The cover member 200 may be fixed and/or fitted to the upper portion of the secondary battery module 100. The second horizontal part 210 may further include horizontal members 213 that are perpendicular to the second vertical parts 212. The horizontal members 213 may extend between respective portions of the second vertical parts 212 and/or the second sidewall part 220.

Referring to FIGS. 1 and 2D, a second elastic member 300 may be disposed on a contact part 211 between the cover member 200 and the top surface 100a of the secondary battery module 100. The second elastic member 300 may be, e.g., a leaf spring. The second elastic member 300 (hereinafter, referred to as a leaf spring) may contact a bottom surface of the second horizontal part 210 between the through holes 214. The leaf spring 300 may extend in an array direction of the secondary batteries 10, 20, 30, 40, 50, 60, 70, 80, e.g., along an x-direction. The leaf spring 300 may absorb shock and vibration applied from the outside of the cover member 200 to protect the secondary battery module 100, thereby improving the durability thereof. The leaf spring 300 may include, e.g., a copper alloy having high elasticity, such as one of phosphorus bronze, beryllium copper, and brass.

The secondary batteries 10, 20, 30, 40, 50, 60, 70, 80 may be arranged in parallel and may be electrically connected to one another through bus bars 610, 620, 630, 640, 650, 660, 670. The secondary batteries 10, 20, 30, 40, 50, 60, 70, 80 may be connected to one another in series and/or in parallel through the bus bars 610, 620, 630, 640, 650, 660, 670, which are electrically conductive. The bus bars 610, 620, 630, 640, 650, 660, 670 include through holes 611, 621, 631, 641, 651, 661, 671 at both sides thereof, respectively. The through holes 611, 621, 631, 641, 651, 661, 671 are coupled to positive terminals (also denoted by 11, 21, 31, 41, 51, 61, 71, 81) and negative terminals (also denoted by 12, 22, 32, 42, 52, 62, 72, 82) of the secondary batteries 10, 20, 30, 40, 50, 60, 70, 80. Top surfaces of the secondary batteries 10, 20, 30, 40, 50, 60, 70, 80 may be coupled to the leaf spring 300 extending in the array direction thereof, e.g., along x-direction. The positive terminals 11, 21, 31, 41, 51, 61, 71, 81, and the negative terminals 12, 22, 32, 42, 52, 62, 72, 82 may be coupled to nuts 612, 622, 632, 642, 652, 662, 672, after passing through the bus bars 610, 620, 630, 640, 650, 660, 670. In one or more alternative embodiments, e.g., the positive terminals 11, 21, 31, 41, 51, 61, 71, 81, and the negative terminals 12, 22, 32, 42, 52, 62, 72, 82 may be riveted (not shown) to the bus bars 610, 620, 630, 640, 650, 660, 670, after passing through the bus bars 610, 620, 630, 640, 650, 660, 670. The top and bottom surfaces of the secondary battery module 100 configured as described above may be coupled to the cover member 200 and the support member 400, respectively. The bus bars 610, 620, 630, 640, 650, 660, 670 may be include stainless steel, aluminum, an aluminum alloy, copper, a copper alloy, and/or an equivalent thereof.

Referring to FIG. 2E, the support member 400 at least partially covers the bottom surface of the secondary battery module 100 to support the secondary battery module 100. That is, the support member 400 may at least partially cover bottom surfaces 13a, 23a, 33a, 43a, 53a, 63a, 73a, 83a of cases 13, 23, 33, 43, 53, 63, 73, 83 of the secondary batteries 10, 20, 30, 40, 50, 60, 70, 80.

Referring to FIGS. 1 and 2E, the support member 400 may include a first horizontal part 410 and a first sidewall part 420. A bottom surface 400a of the support member 400 and/or a bottom surface 410a of the first horizontal part 410 may be flat. The first horizontal part 410 may include a plurality of discharge holes 414 to discharge and introduce gas or water. The first sidewall part 420 may extend upward from, e.g., edges of the first horizontal part 410. The first sidewall part 420 may receive a lower portion of the secondary battery module 100. The first sidewall part 420 may be arranged perpendicular to the first horizontal part 410. The first sidewall part 420 may include sidewalls 421, 422, 423, 424.

The first horizontal part 410 may further include first vertical parts 412 that protrude upward toward the secondary battery module 100. The combination of the first horizontal part 410 and the first vertical parts 412 may create a cavity-like region to receive lower portions of the secondary batteries 10, 20, 30, 40, 50, 60, 70, 80. More particularly, the first vertical parts 412 may at least partially fit between the secondary batteries 10, 20, 30, 40, 50, 60, 70, 80 and may at least partially cover at least some of the lower portion of the second battery module 100. The first vertical parts 412 may be disposed at a lower position than that of the first sidewall part 420. More particularly, the first vertical parts 412 may contact a bottom surface 100b of the secondary battery module 100. The first sidewall part 420 may at least partially cover the bottom surface 100b of the secondary battery module 100 and may surround a bottom portion of the secondary battery module 100 and side surfaces adjacent to the bottom surface. As such, e.g., the support member 400 may be coupled to the lower portion of the secondary battery module 100. The first horizontal part 410 may further include horizontal members 411 that are perpendicular to the first vertical parts 412. The first horizontal members 411 may extend between respective portions of the first vertical parts 412 and/or the first sidewall part 420. The first horizontal members 411 may support the secondary battery module 100 on the support member 400.

The first horizontal part 410 may include positioning recesses 413 coupled to the energy generating parts 450. Each of the secondary batteries 10, 20, 30, 40, 50, 60, 70, 80 may be associated with at least one of the positioning recesses 413. In one or more embodiments, e.g., assuming there are m secondary batteries, there may be at least m positioning recesses 413. In some embodiments, e.g., there may be a plurality of, e.g., 2 m, positioning recesses 413 such that each of the secondary batteries 10, 20, 30, 40, 50, 60, 70, 80 is associated with two or more of the positioning recesses 413. More particularly, referring to FIG. 2E, the positioning recesses 413 (also denoted by 413a, 413b, 413c, 413d, 413e, 413f, 413g, and 413h) may be disposed, e.g., at one or more side portions of a top surface 410b of the first horizontal part 410. Line through holes 415 (see, e.g., FIG. 3B) may be disposed under the positioning recesses 413 to connect the energy generating parts 450 to the energy supplying part 500.

Referring to FIG. 1, the energy generating parts 450 may be disposed between the secondary battery module 100 and the support member 400. The energy generating part 450 may include the first elastic member 430 contacting the secondary battery module 100, and a piezoelectric device 440 between the first elastic member 430 and the support member 400. The first elastic members 430 may be, e.g., coil springs.

Referring to FIGS. 1, 3A, and 3B, the piezoelectric devices 440 may apply electrical energy generated by a vertical movement of the secondary battery module 100 disposed over the piezoelectric devices 440, to the energy supplying part 500. The piezoelectric devices 440 use a piezoelectric effect that coil springs (also denoted by 430) are refracted and stretched by a vertical movement of the secondary battery module 100 to generate electricity. When the retracting and stretching of the coil springs 430 are repeated by vertical movements of the secondary battery module 100, a positive (+) charge is generated at a side of the piezoelectric devices 440 and a negative charge (−) is generated at the other side thereof, thereby producing voltage.

Referring to FIGS. 1 and 3B, points of the piezoelectric devices 440 where the positive charge (+) is generated may be referred to as first contact points, and points of the piezoelectric devices 440 where the negative charge (−) is generated may be referred to as second contact points. In this case, the first contact points of the piezoelectric devices 440 may be electrically connected to a positive terminal of the energy supplying part 500 through a conductive line L1b. The second contact points of the piezoelectric devices 440 may electrically connected to a negative terminal of the energy supplying part 500 through a conductive line L1a. The piezoelectric devices 440 may be coupled to the lower portions of the coil springs 430 (also denoted by 430a, 430b, 430c, 430d, 430e, 430f, 430g, and 430h). The conductive line L1b and the conductive line L1a may protrude out of the support member 400 from the first and second contact points of the piezoelectric devices 440 (also denoted by 440a, 440b, 440c, 440d, 440e, 440f, 440g, and 440h) and may electrically connect to the positive and negative terminals of the energy supplying part 500, respectively. In one or more embodiments, the conductive line L1b and the conductive line L1a may protrude out of the support member 400 through the line through holes 415.

The piezoelectric devices 440a, 440b, 440c, 440d, 440e, 440f, 440g, 440h may be coupled to inner lower portions of the positioning recesses 413a, 413b, 413c, 413d, 413e, 413f, 413g, 413h. The coil springs 430a, 430b, 430c, 430d, 430e, 430f, 430g, 430l may be coupled to upper portions of the piezoelectric devices 440a, 440b, 440c, 440d, 440e, 440f, 440g, 440h. In one or more embodiments, the upper portions of the coil springs 430a, 430b, 430c, 430d, 430e, 430f, 430g, 430h may protrude out beyond upper portions of the positioning recesses 413a, 413b, 413c, 413d, 413e, 413f, 413g, 413h. The upper portions of the coil springs 430a, 430b, 430c, 430d, 430e, 430f, 430g, 430h may contact coupling recesses 13a1, 23a1, 33a1, 43a1, 53a1, 63a1, 73a1, 83a1 in bottom surfaces 13a, 23a, 33a, 43a, 53a, 63a, 73a, 83a of the secondary batteries 10, 20, 30, 40, 50, 60, 70, 80 to absorb shock or vibration applied from the outside of the secondary battery module 100, thereby improving the durability of the secondary battery module 100.

The energy supplying part 500 may be electrically connected to the collecting terminals 11 and 12 through a conductive line L2a and a conductive line L2b. The conductive line L2a is disposed between the energy generating part 450 and the collecting terminals 12. The conductive line L2b is disposed between the energy generating part 450 and the collecting terminals 11. That is, the positive and negative terminals of the energy supplying part 500 are different in electric potential, and electrically connect the first and second contact points of the piezoelectric device 440 of the energy generating part 450 to the positive and negative terminals 11 and 12 of the secondary battery 10, respectively. The energy supplying part 500 applies electrical energy generated by the piezoelectric devices 440 to the positive and negative terminals 11 and 12 of the secondary battery 10. That is, the energy supplying part 500 supplies an electric current in a forward direction toward the side of the collecting terminals 11 and 12 according to the direction of voltage applied from the piezoelectric device 440.

Referring to FIG. 4., the energy supplying part 500 may include a voltage boosting part 510, a rectifier 520, and an overvoltage protection part 530. The voltage boosting part 510 may boost electrical energy produced by the piezoelectric devices 440. More particularly, the voltage boosting part 510 may boost a low level voltage produced by the piezoelectric devices 440a, 440b, 440c, 440d, 440e, 440f, 440g, 440h to a high level voltage for charging the secondary battery module 100. The rectifier 520 may rectify the high voltage output from the voltage boosting part 510 to a direct current (DC) voltage. Then, the DC voltage may be applied to the positive terminal 11 and the negative terminal 12 of the secondary battery 10. The rectifier 520 may be, e.g., a rectification circuit including a combination of rectification elements, such as a silicon rectifier. The overvoltage protection part 530 may limit the DC voltage of the rectifier 520 to a charge voltage value of the secondary battery module 100 or to a smaller value than the charge voltage value. That is, the overvoltage protection part 530 may prevent a voltage, which is boosted and rectified by the voltage boosting part 510 and the rectifier 520, from rising over a charge voltage value for charging the secondary battery module 100.

In one or more embodiments, voltage produced by a vertical movement of the secondary battery module 100 may be applied to the positive and negative terminals 11 and 12 of the secondary battery 10 through the energy generating part 450 and the energy supplying part 500 so as to charge the secondary battery 10 and the secondary battery module 100.

In one or more embodiments, electrical energy generated by a vertical movement of the secondary battery may be used to charge the secondary battery, thereby improving the efficiency of the battery pack.

FIGS. 5A through 5E illustrate perspective views of stages in an exemplary embodiment of a method of assembling the battery pack of FIG. 1 including the secondary battery module 100.

Figure 5A:
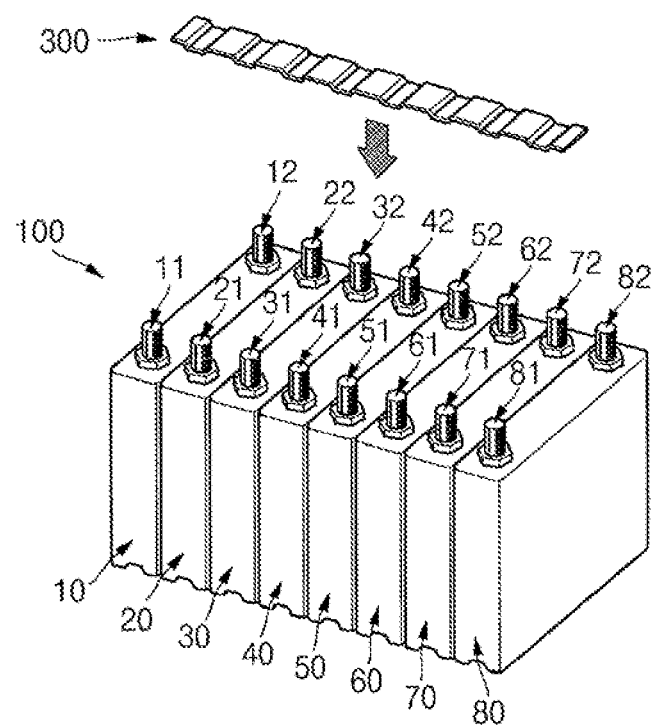

Referring to FIG. 5A, the leaf spring 300 may be coupled to the secondary battery module 100 in which the secondary batteries 10, 20, 30, 40, 50, 60, 70, 80 may be arranged in parallel and electrically connected to one another. That is, the leaf spring 300 extending in the array direction of the secondary batteries 10, 20, 30, 40, 50, 60, 70, 80 may be disposed between a group of the positive terminals 11, 21, 31, 41, 51, 61, 71, 81, and a group of the negative terminals 12, 22, 32, 42, 52, 62, 72, and 82, which may be disposed on top surfaces of the secondary batteries 10, 20, 30, 40, 50, 60, 70, 80.

Figure 5B:
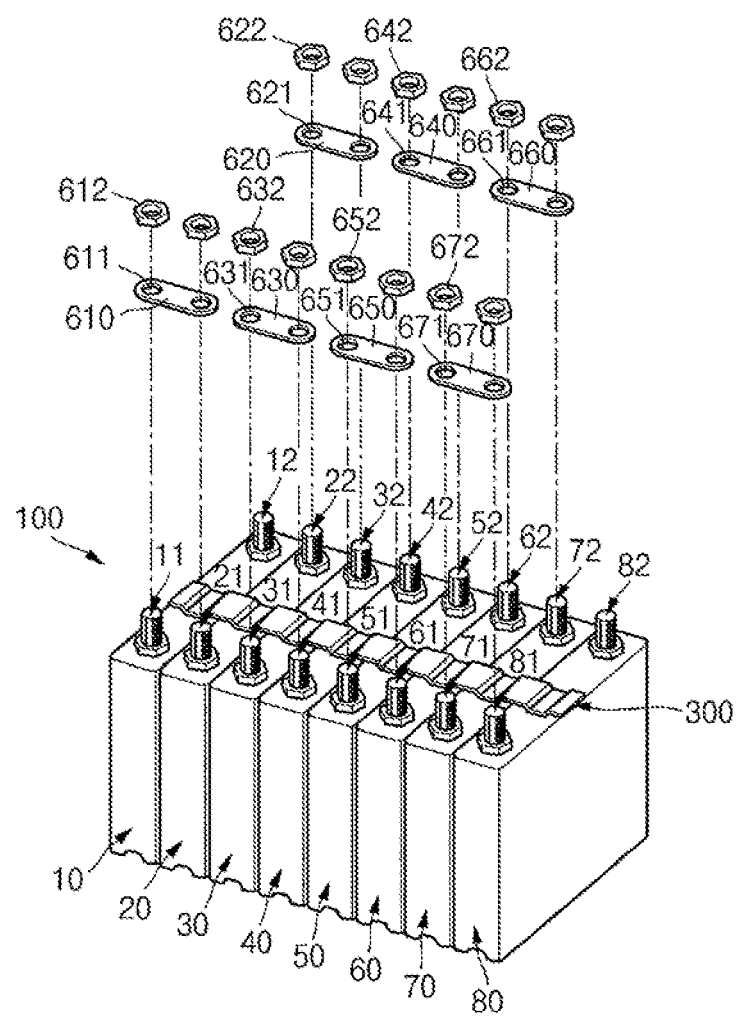

Referring to FIG. 5B, the secondary batteries 10, 20, 30, 40, 50, 60, 70, 80 may be connected to one another in series and/or in parallel through the bus bars 610, 620, 630, 640, 650, 660, 670, which are electrically conductive. The bus bars 610, 620, 630, 640, 650, 660, 670 may include the through holes 611, 621, 631, 641, 651, 661, 671 at both sides thereof, respectively. The through holes 611, 621, 631, 641, 651, 661, 671 may be respectively coupled to the positive terminals 11, 21, 31, 41, 51, 61, 71, 81 and the negative terminals 12, 22, 32, 42, 52, 62, 72, 82 of the secondary batteries 10, 20, 30, 40, 50, 60, 70, and 80.

Figure 5C:
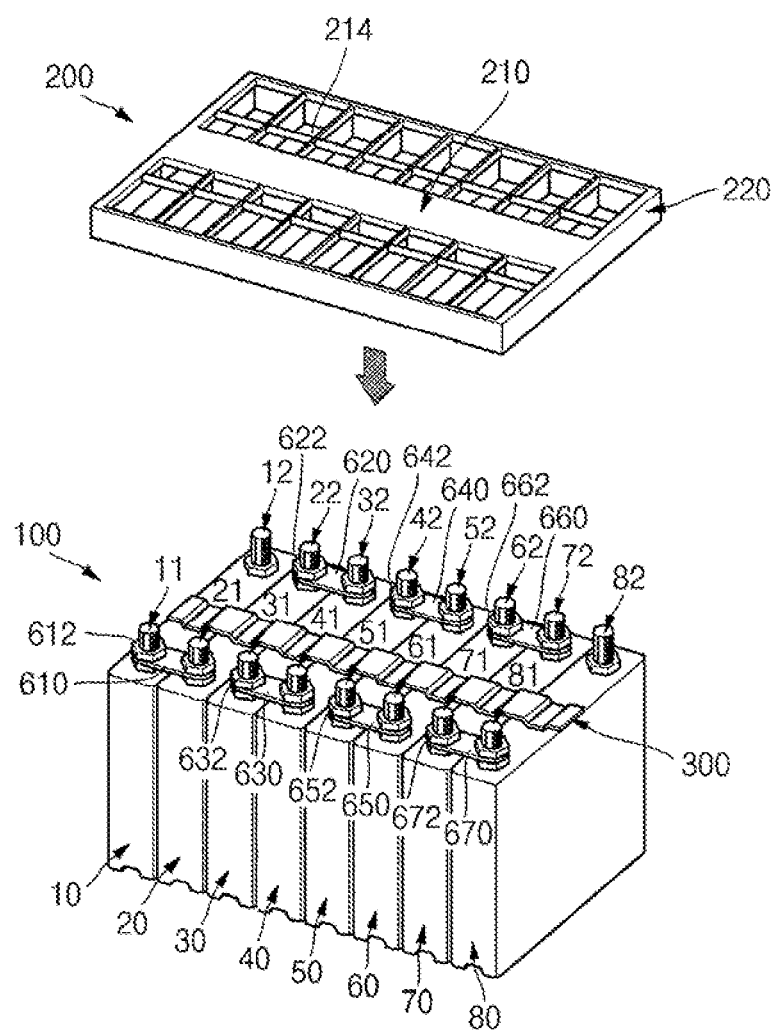

Referring to FIG. 5C, the cover member 200 may be coupled to both the secondary battery module 100 and the leaf spring 300. That is, the second horizontal part 210 of the cover member 200 may closely contact the leaf spring 300, and the positive terminals 11, 21, 31, 41, 51, 61, 71, 81 and the negative terminals 12, 22, 32, 42, 52, 62, 72, 82 may pass through the through holes 214, and the second sidewall part 220 may surround upper edges of the secondary batteries 10, 20, 30, 40, 50, 60, 70, 80.

Referring to FIG. 5D, the support member 400 may be coupled to the lower portion of the secondary battery module 100. In one or more embodiments, the piezoelectric devices 440 and the coil springs 430 may be sequentially stacked upward in the positioning recesses 413 of the support member 400, and the upper portions of the coil springs 430 may be coupled to the coupling recesses 13a1, 23a1, 33a1, 43a1, 53a1, 63a1, 73a1, 83a1 in the bottom surfaces of the secondary batteries 10, 20, 30, 40, 50, 60, 70, 80.

Figure 5E:
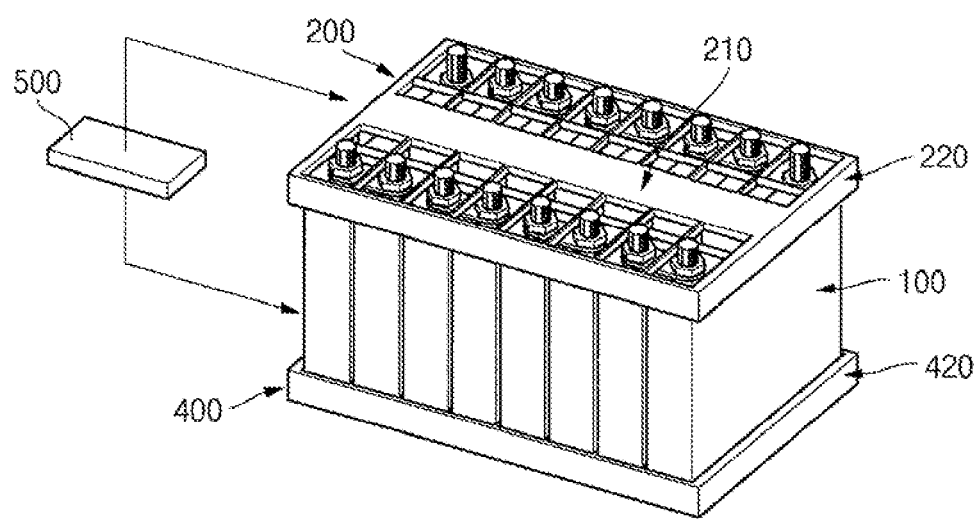

Referring to FIG. 5E, the energy supplying part 500 may be connected through conductive lines to the piezoelectric devices 440 of the energy generating parts 450 and the collecting terminals 11 and 12 of the secondary battery 10. The positive and negative terminals of the energy supplying part 500 may be electrically connected to the first and second contact points of the piezoelectric devices 440 of the energy generating parts 450, respectively, and may be electrically connected to the positive terminal 11 and the negative terminal 12 of the secondary battery 10, respectively.

In one or more embodiments, voltage produced by the piezoelectric devices 440 according to a vertical movement of the secondary battery module 100 including the secondary battery 10 may be applied to the positive and negative terminals 11 and 12 of the secondary battery 10 through the energy supplying part 500, so as to charge the secondary battery 10 and the secondary battery module 100.

In one or more embodiments, electrical energy generated by a vertical movement of the secondary battery may be used to charge the secondary battery.

In one or more embodiments, with top and bottom surfaces of a secondary battery being coupled to a flat cover member and a flat support member, respectively, the flatness, durability and assembly quality of the secondary battery module can be ensured.

In one or more embodiments, one or more elastic members may be disposed between a top surface of a secondary battery and a cover member and/or between a bottom surface of the secondary battery and a support member to absorb vibration, thereby improving the durability of a battery pack against external shock and vibration.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A battery pack, comprising:
   at least one secondary battery including: an electrode assembly; a case accommodating the electrode assembly; and a collecting terminal electrically connected to the electrode assembly and protruding out of the case, the collecting terminal having a positive collecting terminal and a negative collecting terminal;
   a support member supporting a bottom portion of the secondary battery;
   a cover member including a first through hole and a second through hole through which the positive collecting terminal and the negative collecting terminal pass, respectively, and surrounding an upper portion of the secondary battery;
   an energy generator between the bottom portion of the secondary battery and the support member and to generate electrical energy, the energy generator having a positive contact point and a negative contact point; and
   an energy supplier to supply the electrical energy generated from the energy generator to the secondary battery, the energy supplier having a positive terminal and a negative terminal, wherein
   a first conductive line electrically couples the positive contact point of the energy generator with the positive terminal of the energy supplier and a second conductive line electrically couples the negative contact point of the energy generator with the negative terminal of the energy supplier.

2. The battery pack as claimed in claim 1, wherein the energy generator comprises:
   an elastic member contacting the secondary battery; and
   a piezoelectric device between the elastic member and the support member.

3. The battery pack as claimed in claim 2, wherein the elastic member comprises a coil spring.

4. The battery pack as claimed in claim 2, wherein the piezoelectric device generates electrical energy by a vertical movement of the secondary battery.

5. The battery pack as claimed in claim 1, wherein the energy supplier comprises:

a voltage booster to boost the electrical energy generated by the energy generator to a voltage having a level for charging the secondary battery;

a rectifier to rectify the voltage output from the voltage booster to a direct current voltage; and an overvoltage protector to limit the direct current voltage to a charge voltage value of the secondary battery or to a smaller value than the charge voltage value.

6. The battery pack as claimed in claim 2, wherein the positive terminal of the energy supplier is electrically connected to a positive terminal of the collecting terminal, and the negative terminal of the energy supplier is electrically connected to a negative terminal of the collecting terminal.

7. The battery pack as claimed in claim 2, wherein the support member comprises:

a horizontal part having a flat surface; and a sidewall part extending from an edge of the horizontal part toward the secondary battery.

8. The battery pack as claimed in claim 7, wherein the horizontal part comprises a positioning recess that is coupled to the energy generator.

9. The battery pack as claimed in claim 8, wherein a line through hole is disposed under the positioning recess.

10. The battery pack as claimed in claim 7, wherein the horizontal part comprises a vertical part protruding toward the secondary battery such that the vertical part at least partially fits between the secondary battery.

11. The battery pack as claimed in claim 10, wherein the vertical part is disposed at a lower position than that of the sidewall part and the vertical part and the sidewall part define a cavity-like region for receiving the secondary battery.

12. A battery pack, comprising:

at least one secondary battery including a collecting terminal protruding out of an upper portion of the at least one secondary battery, the collecting terminal having a positive collecting terminal and a negative collecting terminal;

a support member supporting a bottom portion of the secondary battery;

a cover member including a first through hole and a second through hole through which the positive collecting terminal and the negative collecting terminal pass, respectively, and surrounding the upper portion of the secondary battery;

an energy generator between the bottom portion of the secondary battery and the supporting member, the energy generator to generate electrical energy based on movement of the secondary battery, the energy generator having a positive contact point and a negative contact point; and an energy supplier to supply the electrical energy generated from the energy generator to the secondary battery, the energy supplier having a positive terminal and a negative terminal, wherein a first conductive line electrically couples the positive contact point of the energy generator with the positive terminal of the energy supplier and a second conductive line electrically couples the negative contact point of the energy generator with the negative terminal of the energy supplier.

13. The battery pack as claimed in claim 12, wherein the secondary battery includes at least one coupling recess along the bottom portion, and the energy generator is at least partially arranged within the coupling recess of the secondary battery.

14. The battery pack as claimed in claim 12, wherein the energy generator includes an elastic member and a piezoelectric device, the elastic member being arranged between the bottom portion of the secondary battery and the piezoelectric device.

15. The battery pack as claimed in claim 14, wherein the elastic member is a coil spring.

16. The battery pack as claimed in claim 14, wherein the energy generator generates electrical energy from movement of the secondary battery relative to the elastic member.

17. A battery pack including at least one secondary battery, the at least one secondary battery including a collecting terminal protruding out of an upper portion of the at least one secondary battery, the collecting terminal having a positive collecting terminal and a negative collecting terminal, wherein: a bottom portion of the at least one secondary battery is supported by a support member; and the upper portion of the at least one secondary battery is surrounded by a covering member, the cover member including a first through hole and a second through hole through which the positive collecting terminal and the negative collecting terminal pass, respectively, comprising:

energy generators between the bottom portion of the at least secondary battery and the supporting member, the energy generators for generating electrical energy based on movement of the secondary battery, the energy generator being arranged between the covering member and the secondary battery, each of the energy generators having a positive contact point and a negative contact point; and energy suppliers for supplying the electrical energy generated from the energy generator to the secondary battery, the energy supplier having a positive terminal and a negative terminal, wherein a first conductive line electrically couples the positive contact point of each of the energy generators with the positive terminal of the energy supplier and a second conductive line electrically couples the negative contact point of each of the energy generators with the negative terminal of the energy supplier.

* * * * *